United States Patent [19]

Klotz et al.

[11] Patent Number: 4,626,453
[45] Date of Patent: Dec. 2, 1986

[54] COATING COMPOSITIONS AND METHOD FOR IMPROVING THE PROPERTIES OF COATED SUBSTRATES

[75] Inventors: Brian L. Klotz; James M. Klotz, both of Quakertown, Pa.

[73] Assignee: Coatings for Industry, Inc., Souderton, Pa.

[21] Appl. No.: 778,373

[22] Filed: Sep. 20, 1985

[51] Int. Cl.$^4$ .......................... B05D 3/02; C09D 5/10
[52] U.S. Cl. ............................... 427/397.7; 427/419.1; 106/14.21; 148/6.16
[58] Field of Search .............. 106/14.12, 14.15, 14.17, 106/14.21, 1.12, 1.13, 1.14, 1.19, 1.25; 148/6.15, 6.16; 427/383.3, 383.7, 376.3, 376.5, 376.6, 397.7

[56] References Cited

U.S. PATENT DOCUMENTS

| | | | |
|---|---|---|---|
| 4,319,924 | 3/1982 | Collins, Jr. et al. | 106/14.21 |
| 4,381,323 | 4/1983 | Lowe et al. | 427/383.7 |

*Primary Examiner*—Paul Lieberman
*Assistant Examiner*—John F. McNally
*Attorney, Agent, or Firm*—John T. Synnestvedt; Alexis Barron; Martin F. Savitzky

[57] ABSTRACT

An acidic aqueous coating composition comprising dissolved phosphate, dissolved aluminum, dissolved dichromate, inorganic colloidal particles and a water miscible organic component including an effective film-forming amount of a water miscible material comprising an ether of a polypropylene glycol, and preferably including also another glycol material, for example, a mono-ethylene glycol material or a monopropylene glycol material, for use as a glaze coating, or as a base coating which includes also a particulate material.

16 Claims, No Drawings

COATING COMPOSITIONS AND METHOD FOR IMPROVING THE PROPERTIES OF COATED SUBSTRATES

FIELD OF THE INVENTION

This invention relates to coating compositions and to the use thereof for the purpose of improving properties of substrates which can be used in a wide variety of applications. This invention relates also to an aqueous glazing composition which can be applied to a relatively porous and/or rough inorganic base coating and which can be cured into a coating which imparts desired properties to the underlying coated substrate.

It is known to apply directly to metallic and other types of substrates coatings which protect the substrate from corrosive elements and/or which have other beneficial properties. One type of coating composition that is useful for protecting various types of substrates under high temperature and highly corrosive conditions is an inorganic composition containing dissolved phosphate, dissolved dichromate or molybdate, solid particulate material such as powdered metal, powdered metallic alloys, and refractory metal oxides, and optionally, dissolved metal, for example, aluminum, magnesium, sodium, or zinc. Examples of such coating compositions are disclosed in a publication entitled "Invesigation of Aluminum Phosphate Coatings for Thermal Insulation of Air Frames", by Eubanks and Moore, National Aeronautics and Space Administration (NASA Technical Note D-106, 1959) and U.S. Pat. No. 3,248,251 to Allen. Coatings formed from the aforementioned type composition have corrosion resistant and/or other beneficial properties, depending on the specific solid particulate material used in the composition and the amount applied directly to the substrate. Examples of such other properties include high heat resistance, abrasion resistance and electrical characteristics. For example, coatings having particularly high heat resistance include a refractory metal oxide such as powdered quartz or alumina ($Al_2O_3$).

For use in certain applications, industrial standards require that coatings of the aforementioned type have excellent adhesive and corrosion-resistant properties after being evaluated in each of the following tests: (1) 5% salt spray for a minimum of 144 hours; (2) 100% relative humidity at 100° F. for a minimum of 144 hours; (3) hot water (180° F. ) for a minimum of 24 hours; (4) steam vapor for a minimum of 144 hours; and (5) hot saline condensates for a minimum of 24 hours.

Articles coated with the aforementioned type of coatings can be used in various applications where they otherwise would not be suitable for use, including aerospace, automotive, marine and metal working applications. However, such coatings are not entirely suitable for all uses. For example, they do not possess the surface smoothness desired for certain aerospace applications and the properties thereof can be eroded over time when they are subjected to the harshest of conditions. For these more demanding uses, an overlying or glaze coating may be required to improve the surface or other characteristics of the coated article.

Glaze coatings are prepared by applying to the underlying coating (also referred to herein as "base coating") a glazing composition, the usefulness of which is dependent on its ease of application and the appearance of the cured glaze. For many applications, a glazing composition is considered unacceptable if it is not easy to apply to a substrate, that is, if it wets the surface unevenly or sags, thereby resulting in surface flaws, including mottling, cracking or blistering. These types of surface flaws result frequently in a decrease in other desired properties, such as corrosion resistance and surface smoothness.

This invention relates to an improved coating composition, including one which can be used to form a glaze coating on an underlying coating and which can be used to improve the corrosion-resistance, scratch-resistance, surface smoothness and appearance of coated articles.

PRIOR ART

U.S. Pat. No. 4,381,323 (hereinafter the '323 patent) to J. M. Klotz and G. A. Collins, Jr. discloses a coating composition which is described as being useful for forming a glaze coating on a base coating of the type which includes particulate material as mentioned hereinabove. The glaze coating composition comprises an acidic aqueous solution containing dissolved phosphate, dissolved dichromate, dissolved aluminum and an amine. It has been found that glaze coatings formed from this type of composition are scratched rather easily and can be wiped off readily with a cloth.

More recent work by the present inventors resulted in the modification of the aforementioned glaze coating composition by including therein a mixture of ethylene glycol ethers, such as Cellosolve acetate and Cellosolve. However, several problems were encountered when such compositions were used to form glaze coatings on aluminum-containing base coatings. The coatings exhibited poor scratch resistance and blistering and were mottled. In addition, such glaze coating compositions are difficult to apply, this resulting in poor adhesive properties. Furthermore, there are reports to the effect that ethylene glycol ether materials are potentially toxic to humans and teratogenic (birth defects in rats have been reported) and produce fetotoxicity in laboratory animals at low doses.

Thus, it is an object of this invention to provide an improved coating composition, including a glazing composition which can be easily applied to an underlying coating and which is capable of forming a uniformly adherent, blister-free, scratch- and corrosion-resistant glaze coating having a uniform appearance.

It is another object of this invention to provide a glaze coating composition which is relatively safe to use and does not include toxic volatile organic ingredients.

SUMMARY OF THE INVENTION

In accordance with this invention, there is provided an acidic aqueous coating composition comprising dissolved phosphate, dissolved aluminum, dissolved dichromate, inorganic colloidal particles and a water miscible organic component including an effective film-forming amount of a water miscible material comprising an ether of a polypropylene glycol. The preferred ether for use in the composition is a polypropylene glycol monoalkyl ether.

In preferred form, the water miscible organic component includes another glycol material, for example, a mono-ethylene glycol material or a mono-propylene glycol material.

Another aspect of this invention relates to a method for improving the properties of an aluminum-containing phosphate-bonded coating comprising contacting said coating with an acidic aqueous glazing composition of the aforementioned type, that is, one comprising dissolved phosphate, dissolved aluminum, dissolved dichromate, inorganic colloidal particles and a water miscible organic component including an effective film-forming amount of a water miscible material comprising an ether of polypropylene glycol.

Further aspects of this invention relate to including in the aforementioned coating composition of the present invention a solid particulate material and applying the resulting coating composition to a substrate. Such a composition which includes said particulate material is capable of being applied to an uncoated substrate in a single application to form thereon a relatively thick coating.

It is believed that the coating composition of the present invention will be used most widely in coating metallic substrates such as iron and iron alloys and other metals which are used in applications of the type in which the coated articles are subjected to severe corrosive environments or required to possess special properties due to peculiar use requirements.

Compositions within the scope of the present invention are capable of being used to form blister-free, uniformely smooth and adherent coatings which exhibit excellent resistance to scratching and corrosion. In addition, compositions within the scope of the present invention are capable of being formulated from non-toxic and non volatile materials.

DETAILED DESCRIPTION OF THE INVENTION

The essential ingredients of the aqueous acidic coating composition of this invention are water, dissolved phosphate, dissolved dichromate, dissolved aluminum, inorganic colloidal particles and a water miscible organic component comprising a polypropylene glycol ether.

The term "dissolved phosphate" as used herein includes $PO_4^{-3}$, $HPO_4^{-2}$ and $H_2PO_4^{-1}$. Any water soluble compound which is a source of dissolved phosphate can be used, in preparing the composition of this invention. Examples of such compounds are: ortho, meta, pyro, and hypo phosphoric acids; anhydrous and hydrated metal phosphate salts such as the monobasic phosphates of aluminum, magnesium, zinc, calcium, sodium, potassium and lithium, and dibasic phosphates of magnesium and calcium, and the tribasic phosphates of magnesium, zinc and lithium and mixtures thereof.

The use of orthophosphoric acid is preferred. Excellent results have been attained using this material, which is readily available and relatively inexpensive.

Any water soluble compound which is a source of dissolved dichromate ($Cr_2O_7^{-2}$) can be used in preparing the composition of this invention. Examples of water soluble dichromate salts that can be used are sodium dichromate, potassium dichromate and other metal dichromates such as those of magnesium, calcium and zinc. Since the coating composition of the present invention is acidic, chromic acid and its anhydride ($CrO_3$), and water soluble chromate compounds which in acidic medium are oxidized to dichromate can be used also as a source of the dichromate. Examples of metal chromates that can be used are those of potassium, sodium, magnesium, zinc and calcium. A mixture of two or more of the aforementioned sources can be used also.

The use of chromic anhydride is preferred because its use provides excellent results, it is relatively low in cost and readily available, and it is easier to dissolve than certain other chromium compounds.

The source of the dissolved aluminum can be a metal compound which is soluble in the coating composition. Examples of such compounds are metal oxides, metal hydroxides, and metal carbonates. Aluminum in elemental form, for example, in powdered form, can be used also. Mixtures of the aforementioned can be used also.

The colloidal materials for use in the composition of the present invention are inorganic materials. Such materials typically have a particle size of less than about one-tenth micron. Examples of such materials include colloidal alumina, colloidal silica, and hydrous oxides of iron and chromium in colloidal form. Mixtures of the aforementioned can be used. Preferred colloidal materials comprise those which include particles having an average diameter of about 5 to about 15 nm. The use of colloidal silica is preferred.

Examplary colloidal silicas are those sold by DuPont under the mark LUDOX ®, which identifies an aqueous dispersion of colloidal silica having an average particle diameter of less than about 25 nm. Particularly good results have been achieved with the use of LUDOX ®SM, which comprises an aqueous dispersion of about 50 wt. % colloidal silica having an average particle diameter of about 7 nm.

Pursuant to the present invention, there is combined with the aforementioned constituents a polypropylene glycol ether to form an improved glaze coating composition. Examples of such ethers are alkyl ethers of di- and tri-propylene glycols, such as, for example, dipropylene glycol alkyl ether and tripropylene glycol alkyl ether. A mixture of two or more of the ethers can be used. Preferred polypropylene glycol ethers for use in the practice of the present invention are monoalkyl ethers of tripropylene glycol with the use of tripropylene glycol monomethyl ether being particularly preferred.

Although various improvements can be realized by the use of a polypropylene glycol ether in accordance with the present invention, it has been observed that there are applications in which it would be advantageous to have the composition wet the surface to which it is applied to a better extent than is normally experienced. In accordance with the present invention, improved wetting charateristics can he achieved by including in the composition another glycol material. For example, improved uniformity in wetting can be achieved by the use of an additional glycol material. Among the glycol materials which can be used are, for example, mono-ethylene and mono-propylene glycol materials, including, for example, ethylene glycol, propylene glycol ethers (preferred materials), and propylene glycol monoalkyl ether acetates, the last mentioned being particularly preferred. A mixture of two or more of the glycol materials can be used.

The relative proportion of the polypropylene glycol ether and the additional glycol material can vary over a wide range. When using both of these materials, it is recommended that they be used in amounts such that the mixture thereof comprise about 13 to about 80 vol. % of the ether and about 20 to about 87 vol. % of the additional glycol material, with preferred proportions being about 13 to about 20 vol. % of the ether and about 80 to about 87 vol. % of the additional glycol material. The organic component of the acidic aqueous composition is miscible therein. The constituents comprising the organic component can be selected from materials which are themselves considered water miscible, water soluble or slightly water soluble, with the understanding that such materials in the amounts used in the composition are miscible therein.

The composition of the present invention can include optionally an amine constituent, such as diethanolamine. The addition of diethanolamine to the composition is effective in permitting the composition to be cured at temperatures as low as about 190° F. Furthermore, the low-temperature curing of the composition of this invention does not significantly sacrifice any desired properties of the resulting glaze coatings.

The present composition can also contain a pigment which imparts a distinctive color to the resulting glazings.

As mentioned above, another aspect of the present invention involves the formulation of a base coating composition by combining a solid particulate material with the aforementioned ingredients, that is, dissolved phosphate, dissolved dichromate, dissolved aluminum, inorganic colloidal particles and a polypropylene glycol ether. The base coating composition preferably includes the additional glycol material and can contain optionally other constituents, as desired.

The solid particulate materials for use in the composition of the present invention are inorganic materials having a particle size of about one micron and up, and include materials such as refractory and nonrefractory pigments; including metals, intermetallic or metal alloy compounds, cements, ceramics and fillers. Specific examples of the aforementioned types of particulate materials, which are completely insoluble or substantially insoluble in the aqueous composition, are as follows: metals—aluminum, copper, silver and nickel; intermetallic or metal alloy compounds—cobalt/aluminum alloy and aluminum manganese alloy; cements—mixed or complex oxides, silicates, silica and zircon; ceramics—metal oxides such as chromic oxide, silica and powdered quartz, aluminum oxide, cerium oxide, zirconia and beryllia, and refractory carbides such as silicon carbide, molybdenum disilicide, tungsten carbide and boron nitride. Examples of other solid particulate materials that can be used are other metal nitrides, metal borides, titanates, zirconates, metal sulfides and graphite. A preferred particulate material for use in the base coating composition is aluminum metal.

The particle size of the particulate material can vary over a wide range, and accordingly, can be substantially larger than one micron. Indeed, as to larger particle sizes, any particle size or distribution of particle sizes that renders the particulate material capable of being bound to the substrate can be used. In general, particle size selection will depend on the type of application for which the coated substrate is to be used. For example, the particle size of the particulate material can be within the range of about 200 to about 400 mesh. (Unless stated otherwise, the term "mesh" when used herein refers to U.S. Standard Sieve Series.) It is noted that coatings for gas turbine parts, such as compressor, stator and rotary blades, and for other applications where aerodynamic flow is important are generally required to be as fine and smooth as possible so that drag is minimized. For this purpose, a particulate material having a particle size within a range of about 1 to about 10 microns is typically used in the phosphate-bonded coatings described in the prior art. Additional property improvements can be obtained by the use of compositions according to the present invention.

As to amounts of ingredients comprising the composition of the present invention, the dissolved phosphate should be present in an amount such that it functions to form a bond between the underlying base coating or substrate and the colloidal materials and/or the optional particulate material.

The dissolved dichromate should be present in amounts such taht it inhibits the reaction between the phosphate and the coated or uncoated substrate and also any reaction between the colloidal material (and the optional particulate material) and the phosphate. The amount of dichromate should not be so great that the formation of the phosphate bond is prevented.

The dissolved aluminum should be present in amounts such that appropriate improvements in corrosion resistance and adherencey are realized. In general, this occurs at a concentration of about 0.5 mole/liter of aluminum, but the use of higher amounts is preferred, as hereafter noted.

The colloidal materail should be used in an amount to impart two the substrate a coating of the desired thickness. In general, the coatings (without the optional particulate material) are relatively thin, for example, about 0.05 mil to about 2 mil.

As to the amount of optional diethanolamine, it has been found that the mere presence of the amine appears to be effective in reducing the temperature at which the coating composition can be cured satisfactorily. As to the upper concentration limit of the diethanolamine, this will generally be governed by the effect the amine has on the shelf life of the composition and other factors hereafter discussed. Furthermore, it is believed that the diethanolamine reacts to reduce the hexavalent chromium constituent of the composition to trivalent chromium. This is evidenced by a green color which is observed after the amine is added to the composition. The amount of diethanolamine used should not be so great that the hexavalent chromium ingredient is depleted by this reaction to the extent that its contribution to corrosion resistance is significantly adversely affected.

The water miscible polypropylene glycol ether component is present in the composition in an amount sufficient to impart desired properties to the glaze coating prepared therefrom. The preferred amount of water miscible component encourages the uniform wetting of the substrate, the uniform evaporation of the organic and water components of the composition and the formation of the inorganic bonding matrix of the glaze coat, and results in a smooth, blister-free, uniformly adherent glaze coat which is uniform in appearance. To achieve these properties, it is recommended that the composition comprise at least about 7 wt. % of the organic component.

The particulate material may be present in the base coating composition of this invention in an amount which imparts to the substrate a coating of the desired thickness. In general, this will in turn depend on the particular type of application for which the coating is to be used. For example, if the primary function of the coating is to impart electrical conductivity to the substrate, very small amounts of graphite or other conductive material can be used in the composition. On the other hand, substantial amounts of the particulate material, such as aluminum powder, should be used when it is desired that the coating impart high thermal insulating properties to the substrate. Relatively low amounts of the particulate material can be used in applications (for example, optic and aerodynamic flow applications) where it is desired that the coatings be relatively thin. It is believed that widest use of the single base coating composition will be in forming base coatings having a thickness of about 2 to about 4 mils. It should be understood that thinner or thicker coatings can be formed from the base coating composition and that as many coats of the composition can be applied as is necessary to form a coating of the desired thickness.

Thus, the amount of particulate material in the composition can vary over a wide range, for example, about 5 to about 1200 g/l (or even higher) of composition. It is considered that compositions which include about 600 to about 1000 g/l of the particulate material will be used more widely than others. In the use of aluminum as the particulate material, it is particularly preferred to use about 850 to about 950 g/l of composition.

A preferred composition of the present invention comprises about 7 to about 10 wt. % of the water miscible component and ingredients which are the source of the following materials in amounts equivalent to:
(A) at least about 1 M/l of dissolved phosphate;
(B) at least about 0.1 M/l of dissolved dichromate;
(C) at least about 0.5 M/l of dissolved aluminum; and
(D) at least about 0.25 M/l of colloidal silica.

A particularly preferred composition includes:
(A) about 1 to about 6 M/l of dissolved phosphate;
(B) about 0.15 to about 3.5 M/l of dissolved dichromate;
(C) about 1 to about 6 M/l of dissolved aluminum; and
(D) about 0.25 to about 2 M/l of colloidal silica.

A particularly preferred amount of the organic component is about 8 wt. % of the composition.

Another aspect of the present invention comprises a method for improving the scratch and corrosion resistance, impermeability and surface smoothness of an aluminum-containing phosphase-bonded base coating comprising contacting said base coating with the present glazing composition, for example, a composition including an organic component comprising a mixture of tripropylene glycol alkyl ether and propylene glycol monomethyl ether acetate.

Application of the present composition to a base coat prepared according to the process and composition described in U.S. Pat. No. 4,381,323, hereby incorporated by reference, comprises a method according to the present invention for sealing a phosphate-bond coating or improving the corrosion resistance, scratch resistance and surface smoothness of a phosphate-bonded coated article. The steps of this method comprise the following:
(A) contacting a phosphate-bonded coating with an acidic aqueous composition comprising dissolved phosphate, dissolved dichromate, dissolved aluminum, colloidal silica, and an organic component comprising a polypropylene glycol ether to form thereon an overlying film of said composition;
(B) drying said overlying film; and
(C) curing said overlying film.

More particularly, the present method comprises:
(A) forming a wet coating by contacting a substrate with an acidic aqueous coating composition comprising dissolved phosphate, dissolved dichromate, dissolved aluminum, and solid particulate material;
(B) drying and curing said wet coating thereby forming a porous phosphate-bonded undercoating;
(C) contacting said undercoating with an acidic aqueous glazing composition comprising water, dissolved phosphate, dissolved dichromate, dissolved aluminum, colloidal silica and a polypropylene glycol ether;
(D) allowing said glazing composition to penetrate said undercoating and to form thereon an overlying film;
(E) removing substantially all of said water and said ether from said undercoating and said overlying film.

In general, it will be found that satisfactory base coatings can be formed by applying an aqueous composition to a substrate comprising a solid particulate material and the following amounts of ingredients.

|  | Amounts, M/l | Preferred Amounts, M/l |
| --- | --- | --- |
| dissolved phosphate | at least about 1 | about 1 to about 6 |
| dissolved dichromate | at least about 0.1 | about 0.15 to about 3.5 |
| aluminum ion | at least about 0.5 | about 1 to about 6 |
| amine (optional) | at least about 0.02 | about 0.02 to about 0.3 |

Prior to the application of the glaze coating, the surface of the base coat can be treated to increase its conductivity, this in turn leading to improved corrosion resistant properties. Such treatment can comprise the abrasion of the surface with a low pressure blast of fine particles such as aluminum oxide grit, preferably No. 120 grit, until the surface has the desired conductivity. Surface conductivity may be measured using an ohmmeter having a probe separation of about one inch. The abrasion treatment is continued preferably until surface conductivity is measured at about one to about three ohms.

The glazing composition can be applied to the coated substrate according to any available or conventional technique. It is believed that it will be most convenient to apply the composition by conventional procedures used for applying paint, for example, spray, roller and brush. Examples of other techniques for applying the coating composition are electrostatic spray and electrophoretic deposition.

The glazing composition may be prepared by mixing the components of a two-part system. The first part may be characterized as the aqueous part and comprises the dissolved metals and colloidal particles of the composition. The second part comprises the organic component. The two parts are stirred thoroughly and applied preferably first as a light mist coat followed by a heavier coat, which should appear as uniform, wet and glossy, and which may be air dried for about five to about twenty minutes.

The glaze coated substrate can be cured at temperatures as low as about 180° F. The curing time is dependent on the temperature used and can be best selected on the basis of experience. However, for guideline purposes, when curing at a temperature of about 180° F., the curing should be continued for at least about 4 to 6 hours. When curing at a temperature of about 225° F., the curing should be continued for at least about 1 hour. When curing at higher temperatures, for example, about 300° F. to about 650° F., curing can be continued for about 15 to 30 minutes. It should be understood that due to its inorganic nature, the coating composition of the present invention can be cured at higher temperatures, for example, as high as about 1000° F. to about 1600° F.

When utilizing the embodiment of the present invention which does not contain the optional diethanolamine component, the particularly preferred glaze coating is air dried for about 20 minutes at about 150° to about 225° F. and then cured at about 550° to 650° F. for about 20 to about 45 minutes.

In addition to curing the coating composition by exposing it to a heated environment, such as that provided in a hot oven, the composition can be cured also by other methods, examples of which include induction heating, infrared heating and resistance heating.

The thickness of the coating can be varied as desired. For example, the coating can have a thickness within the range of about 0.05 to about 5 mils. Single application compositions, which include an amount of the solid particulate aluminum, preferably form coatings of about 2 to about 2.5 mil thick. Speaking generally, coatings formed from the composition of the present invention, which do not include a particulate material, will have a thickness of about 0.1 to about 0.4 mil/coat. For most glazing applications, it is believed that a glaze coating of about 0.1 to about 2 mils in thickness will be satisfactory.

EXAMPLES

Examples set forth below are illustrative of compositions within the scope of the present invention.

There is decribed below an aqueous binding solution (Solution A) of the present invention to which can be added the water miscible organic component, described in the following numbered examples, to form coating compositions within the scope of the present invention.

| Solution A | |
|---|---|
| $H_2O$ | 25 ml |
| aluminum phosphate and $CrO_3$ solution* | 100 ml |
| colloidal silica (Ludox SM) | 23 g |

*This aluminum phosphate/$CrO_3$ solution was prepared by combining 300 g of hydrated alumina ($Al_2O_3.H_2O$) with 558 ml of 75% phosphoric acid and thereafter high speed mixing. After standing overnight, the solution was decanted from insoluble $Al(OH)_3$ which had settled to the bottom. The resulting solution was diluted with water to yield a 60% by weight aluminum phosphate solution. To 100 ml of this solution, 12 g of ($CrO_3$) were added.

Solution A is an example of an aqueous binding solution that can be described as being versatile in that it can be used very effectively, in admixture with the water miscible organic component, in binding a wide variety of colloidal materials or particulate materials to form coatings in accordance with this invention.

Another aqueous binding solution is described below as Solution B.

Solution B is prepared by combining the listed ingredients below in the order presented while stirring the aqueous solution with a high shear stirrer at a temperature between about 155° to about 175° F.

| Ingredients | gm |
|---|---|
| water | 202.5 |
| phosphoric acid (75%) | 113.3 |
| aluminum oxide hydrate powder | 28.8 |
| $CrO_3$ | 21 |

Stirring is continued until the solution clarifies. Thereafter, colloidal silica (62.2 g LUDOX ®SM) is added to the solution.

The examples set forth below are illustrative of glazing compositions within the scope of the present invention.

EXAMPLE 1

The composition is prepared initially in two parts:
Solution B is mixed with the organic component described below at room temperature in a ratio of 10 parts Solution B to 1 part of organic component.

| tripropylene glycol methyl ether | 15 ml |
|---|---|
| propylene glycol momomethyl ether acetate | 85 ml |

EXAMPLE 1A

The composition is prepared initially in two parts:
Solution B is mixed with the organic component below at room temperature in a ratio of 10 parts Solution B to 1 part of organic component.

| tripropylene glycol methyl ether | 20 ml |
|---|---|
| propylene glycol momomethyl ether acetate | 80 ml |

EXAMPLE 1B

The composition is prepared initially in two parts:
Solution B is mixed with the organic component below at room temperature in a ratio of 10 parts Solution B to 1 part of organic component.

| tripropylene glycol methyl ether | 30 ml |
|---|---|
| propylene glycol momomethyl ether acetate | 70 ml |

EXAMPLE 1C

The composition is prepared initially in two parts:
Solution B is mixed with the organic component below at room temperature in a ratio of 10 parts Solution B to 1 part of organic component.

| tripropylene glycol methyl ether | 40 ml |
|---|---|
| propylene glycol momomethyl ether acetate | 60 ml |

EXAMPLE 1D

The composition is prepared initially in two parts:
Solution B is mixed with the organic component below at room temperature in a ratio of 10 parts Solution B to 1 part of organic component.

| tripropylene glycol methyl ether | 80 ml |
|---|---|
| propylene glycol momomethyl ether acetate | 20 ml |

EXAMPLE 2

Cobalt oxide pigment is included in Solution B of the Example 1 composition.

EXAMPLE 3

Cobalt blue pigment is included in Solution B of the Example 1 composition.

EXAMPLE 4

The aqueous part of the composition is prepared as in Example 1, and the organic component described below is combined with the aqueous part in a ratio of 10:1.

| dipropylene glycol methyl ether | 5 ml |
| propylene glycol momomethyl ether acetate | 80 ml |
| ethylene glycol | 15 ml |

EXAMPLE 5

The aqueous part of the composition is prepared as in Example 1 and combined with the organic component described below in a ratio of 10:1

| dipropylene glycol methyl ether | 85 ml |
| ethylene glycol | 15 ml |

EXAMPLE 6

The aqueous part of the composition is prepared as in Example 1.

| dipropylene glycol methyl ether | 100 ml |

EXAMPLE 7

The aqueous part of the composition is prepared as in Example 1 and combined with the organic component described below in a ratio of about 10:1.

| dipropylene glycol methyl ether | 80 ml |
| ethylene glycol | 10 ml |

EXAMPLE 8

The aqueous part of the composition is prepared as in Example 1 and combined with the organic component described below in a ratio of 10:1.

| tripropylene glycol methyl ether | 10 ml |
| propylene glycol momomethyl ether acetate | 80 ml |
| ethylene glycol | 10 ml |

BASE COAT

A base coating composition prepared from the ingredients listed below is sprayed on a steel plate (1010) in an amount such that a coating having a dry film thickness of about 2 mils is formed.

| water | 204.3 g |
| phosphoric acid (75%) | 113.3 g |
| aluminum hydroxide | 28.8 g |
| $CrO_3$ | 21 g |
| aluminum metal powder | amount equivalent to 900 g/l of the composition |

The coated plate is air dried for 10–15 minutes and baked at 175° F.±25° F. for about 30 minutes. A second coat is applied, forming a dry film thickness of about 4 mils. The coated plate is air dried, baked, cured (about 500°–600° F. for about 30 minutes) and lightly burnished (120 mesh grit blasting at 3 lbs./in² air pressure) until the surface conductance reaches about 1 ohm. Unless stated otherwise, examples hereinbelow which include a base coat were coated with the aforementioned base coating composition in the aforesaid number.

EXAMPLE 1'

The glaze coating composition of Example 1 is lightly sprayed onto the burnished base coating and allowed to air dry. A heavier coating is applied until an even wet coating is achieved. The coating has a dry film thickness of about 0.1 to about 0.2 mil. The coating is air dried for about 10 minutes, dried at a temperature of about 175° F. for 20 minutes and cured at a temperature of about 625° F. for 30 minutes. The nature of the cured glaze coating is described in Table 1 below.

Steel plates are coated with the aforementioned base coating composition in accordance with the procedure described above, and thereafter the resulting coatings are coated with the glaze coating compositions of aforementioned Examples 1A, 1B, 1C, 1D, 2, 3, 4, 5, 6, 7 and 8. The glaze coatings are cured in the manner described in Example 1'. The results are also presented in Table 1 below.

TABLE 1

| Examples | Appearance of Glazed Coated Substrate |
| --- | --- |
| 1' | very smooth, blister-free, very uniform in appearance |
| 1A | very smooth, blister-free, slightly mottled in appearance |
| 1B | very smooth, blister-free, mottled in appearance |
| 1C | very smooth, blister-free, mottled in appearance |
| 1D | slightly rough, slight microscopic blistering, mottled in appearance |
| 2 | smooth, uniform, blister-free, satin black glazing |
| 3 | smooth, uniform, blister-free, blue glazing |
| 4 | smooth, somewhat mottled and spotty in appearance |
| 5 | very smooth, slightly mottled |
| 6 | rough, blister-free, uniform in appearance |
| 7 | very smooth, fairly uniform in appearance, minor mottling |
| 8 | very smooth, fairly uniform in appearance, minor mottling |

Comparative Example A

Six steel panels are spray coated with the base coating composition described above to form a coating having a dry film thickness of about 1 mil. The panels are dried, cured at 625° F. for 30 minutes and are burnished. Half of the panels are spray coated with the glazing composition of Example 1. The coating is dried and cured at 625° F. for 30 minutes. An "X" is scribed on each panel, which is then subjected to the 5% salt spray test. After 500 hours, the "X" on the panels that are not glaze-coated do not show any corrosion, whereas the glaze-coated panels show light corrosion on the "X". However, after 1,000 hours the glaze-coated panels show no change, but the panels that are not glaze-coated show heavy corrosion on the "X".

This test shows that the glaze coat of the present invention improves the long term corrosion resistance of a phosphate-bond coated substrate.

The next two comparative examples show the use of glaze coating compositions which either do not include an organic component or which include an organic component different from the polypropylene glycol ether of the present invention. In all of the comparative examples which follow, the glaze coating compositions are formed and cured in the manner described in Example 1' above.

Comparative Example B

Burnished steel panels coated with the base coating composition described above are treated with aforementioned Solution B, that is, a composition which does not include the water miscible organic component. The resulting glaze coat is soft, friable, easily scratched, and can be easily wiped off the steel panel with a rag.

Comparative Example C

A burnished steel plate coated with the base coating composition described above is treated with a mixture of Solution B and the following water miscible organic component in a ration of 10 (Solution B) to 1 (organic component):

| | |
|---|---|
| Cellosolve (ethylene glycol monoethyl ether) | 5 ml |
| Cellosolve acetate (ethylene glycol monoethyl ether acetate) | 80 ml |
| ethylene glycol | 15 ml |

The resulting coating is slightly blistered yet smooth, has a beige mottled gray appearance and shows evidence of material pooling along the perimeter of the plate.

The next group of comparative examples shows the results of using glazing compositions which include an organic component in an amount less than 7 wt. %.

Comparative Examples D to G

Solution B is combined with the following organic components in a ratio of about 12.5 (Solution B) to 1 (organic component). The resulting compositions are applied to plates previously coated with the base coating composition described above.

| | |
|---|---|
| Example D | |
| tripropylene glycol monomethyl ether | 40 ml |
| propylene glycol monomethyl ether acetate | 60 ml |
| Example E | |
| tripropylene glycol monomethyl ether | 80 ml |
| propylene glycol monomethyl ether acetate | 20 ml |
| Example F | |
| tripropylene glycol monomethyl ether | 90 ml |
| propylene glycol monomethyl ether acetate | 10 ml |
| Example G | |
| tripropylene glycol monomethyl ether | 100 ml |

The results of Comparative Examples D-G are presented in Table 2 below.

TABLE 2

| Comparative Examples | Glazing Characteristics |
|---|---|
| D | rough, field of blisters, mottled in appearance |
| E | rough, field of blisters, slightly mottled with evidence of poor surface wetting and material pooling at the edges of the plate |
| F | rough, minor blistering, slightly mottled with pronounced evidence of poor surface wetting and material pooling at plate edges |
| G | smooth, substantially blister-free, uniform in appearance except for evidence of poor surface wetting |

The glazing composition of the present invention can be used to coat other types of coarse substrates such as, for example, glass, ceramics, refractories, wood and derivatives thereof, and plastics.

We claim:

1. In an acidic aqueous coating composition useful for glazing and sealing phosphate-bonded coatings and containing dissolved phosphate, dissolved dichromate, dissolved aluminum, and inorganic colloidal particles, the improvement comprising including in said composition a water miscible organic component containing a polypropylene glycol monoalkyl ether in an amount sufficient to impart substantially blister-free and uniformly adherent properties to a coating prepared from said composition.

2. A composition according to claim 1 wherein said ether is a tripropylene glycol monoalkyl ether.

3. A composition according to claim 1, wherein said organic component includes also a mono-ethylene glycol or a mono-propylene glycol material.

4. A composition according to claim 3 wherein said ether is tripropylene glycol methyl ether and said material is propylene glycol monomethyl ether acetate.

5. A composition according to claim 3 wherein said organic component comprises about 13 to about 80 vol. % of said ether and about 20 to about 87 vol. % of said material.

6. A composition according to claim 1 comprising at least about 7 wt % of said organic component.

7. A composition according to claim 1 comprising ingredients which are the source of the following materials in amounts equivalent to:
(A) at least about 1 M/l of dissolved phosphate;
(B) at least about 0.1 M/l of dissolved dichromate;
(C) at least about 0.5 M/l of dissolved aluminum; and
(D) at least about 0.25 M/l of colloidal silica.

8. A composition according to claim 7 comprising:
(A) about 1 to about 6 M/l of dissolved phosphate;
(B) about 0.15 to about 3.5 M/l of dissolved dichromate;
(C) about 1 to about 6 M/l of dissolved aluminum; and
(D) about 0.25 to about 2 M/l ($SiO_2$) of colloidal silica.

9. A composition according to claim 8 wherein said colloidal silica has an average particle diameter of less than about 25 nm.

10. A composition according to claim 9 said average particle diameter is about 5 to about 15 nm.

11. A method for improving the properties of an aluminum-containing phosphate-bonded coating comprising contacting said coating with a composition according to claim 1 and forming thereon a glaze coating from said composition.

12. A method according to claim 11 wherein said composition includes an organic component comprising a mixture of tripropylene glycol alkyl ether and propylene glycol monomethyl ether acetate.

13. A method according to claim 12 wherein said organic component comprises about 13 to about 80 vol. % of said ether and about 20 to about 87 vol. % of said acetate.

14. A method according to claim 13 wherein said organic component is present in an amount of at least about 7 wt % of said composition.

15. A process for sealing a phosphate-bonded coating comprising:
(A) contacting said coating with an aqueous acidic composition comprising dissolved phosphate, dissolved dichromate, dissolved aluminum, colloidal silica, and an organic component comprising a polypropylene glycol monoalkyl ether to form thereon an overlying film of said composition;

(B) drying said overlying film; and (C) curing said overlying film.

16. A method for improving the corrosion resistance, scratch resistance, and surface smoothness of an article comprising:

(A) forming a wet coating by contacting a substrate with an acidic aqueous coating composition comprising dissolved phosphate, dissolved dichromate, dissolved aluminum, and solid particulate material;

(B) drying and curing said wet coating thereby forming a porous phosphate-bonded undercoating;

(C) contacting said undercoating with an aqueous acidic glazing composition comprising water, dissolved phosphate, dissolved dichromate, dissolved aluminum, colloidal silica and a water miscible polypropylene, glycol monoalkyl ether;

(D) allowing said glazing composition to penetrate said undercoating and to form thereon an overlying film;

(E) removing substantially all of said water and said ether from said under coating and said overlying film; and (F) curing said overlying film.

* * * * *